United States Patent
Matsumoto

(10) Patent No.: US 9,449,316 B2
(45) Date of Patent: Sep. 20, 2016

(54) SETTLEMENT TERMINAL DEVICE AND SETTLEMENT PROCESS METHOD USING THE SAME

(71) Applicant: PANASONIC INTELLECTUAL PROPERTY MANAGEMENT CO., LTD., Osaka (JP)

(72) Inventor: Manabu Matsumoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/636,400

(22) Filed: Mar. 3, 2015

(65) Prior Publication Data

US 2015/0254624 A1 Sep. 10, 2015

(30) Foreign Application Priority Data

Mar. 10, 2014 (JP) .................................. 2014-046914

(51) Int. Cl.
*G06Q 20/20* (2012.01)
*G09G 5/38* (2006.01)
*G06F 3/0488* (2013.01)
(Continued)

(52) U.S. Cl.
CPC ........... *G06Q 20/206* (2013.01); *G06F 3/0233* (2013.01); *G06F 3/041* (2013.01); *G06F 3/04883* (2013.01); *G06Q 20/204* (2013.01); *G07F 7/088* (2013.01); *G07F 7/1033* (2013.01); *G07G 1/01* (2013.01); *G09G 5/38* (2013.01); *G09G 2340/0492* (2013.01)

(58) Field of Classification Search
CPC .... G06Q 20/206; G06Q 20/204; G09G 5/38; G09G 2340/0492; G06F 3/04883; G06F 3/0233; G06F 3/041; G07G 1/01; G07F 7/088; G07F 1/033
See application file for complete search history.

(56) References Cited

U.S. PATENT DOCUMENTS 5,757,369 A * 5/1998 Ohsawa ................ G06F 1/1626
715/750
6,135,351 A 10/2000 Shiobara et al.
(Continued)

FOREIGN PATENT DOCUMENTS

EP 1001388 5/2000
EP 1615161 1/2006
(Continued)

OTHER PUBLICATIONS

U.S. Appl. No. 14/689,534 to Takeshi Ninomiya et al., which was filed Apr. 17, 2015.

*Primary Examiner* — Kristy A Haupt
(74) *Attorney, Agent, or Firm* — Greenblum & Bernstein, P.L.C.

(57) ABSTRACT

Provided is a settlement terminal device including a plurality of information processing units. The settlement terminal device includes a first information processing unit, a secure second information processing unit, and an orientation detection unit which detects a direction of the settlement terminal device with respect to gravity. The first information processing unit reflects a detection result of the orientation detection unit on an orientation of a first display content displayed on the first display unit, and the second information processing unit determines whether or not to reflect the detection result of the orientation detection unit on an orientation of a second display content, in accordance with the second display content displayed on the second display unit. Thereby, a settlement terminal device capable of easily performing an input operation and display confirmation in a settlement process is provided.

20 Claims, 15 Drawing Sheets

(51) Int. Cl.
- *G06F 3/023* (2006.01)
- *G06F 3/041* (2006.01)
- *G07G 1/01* (2006.01)
- *G07F 7/08* (2006.01)
- *G07F 7/10* (2006.01)

(56) References Cited

U.S. PATENT DOCUMENTS 7,340,413 B2   3/2008   Kasasaku

2003/0004812 A1   1/2003   Kasasaku
2008/0249880 A1   10/2008   Liu et al.
2010/0283860 A1   11/2010   Nader
2011/0065479 A1   3/2011   Nader

FOREIGN PATENT DOCUMENTS

| EP | 2065783 | 6/2009 |
| JP | 2003-016536 | 1/2003 |
| WO | 02/11039 | 2/2002 |
| WO | 2014/023447 | 2/2014 |

* cited by examiner

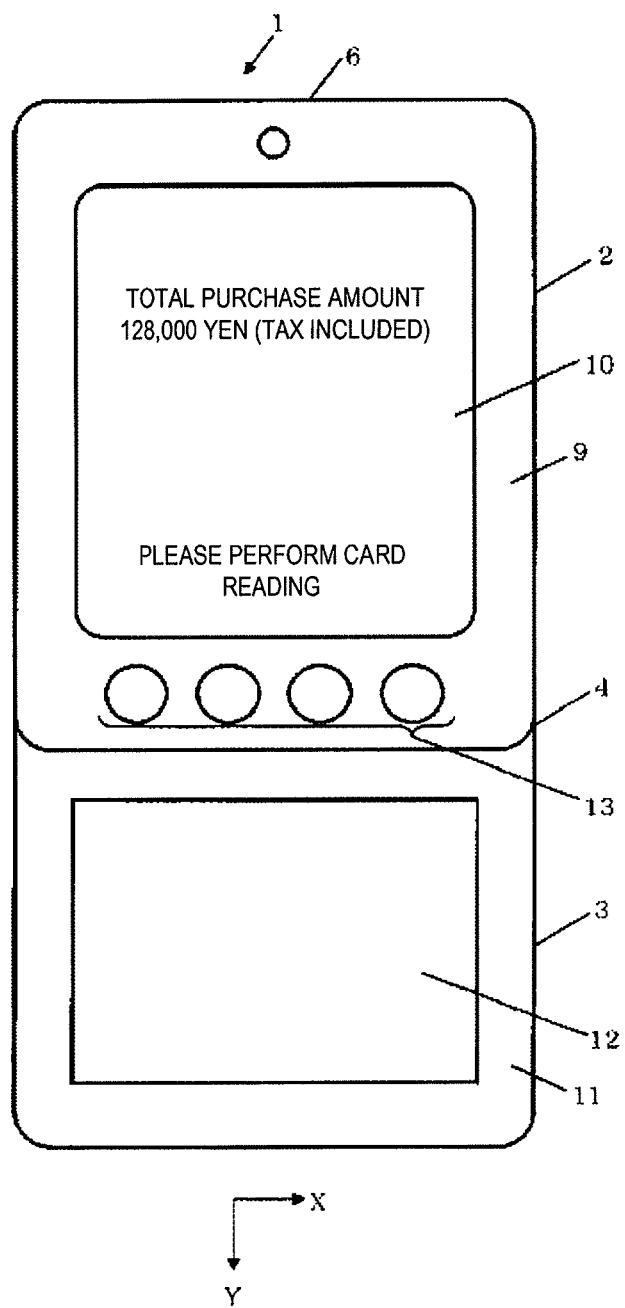

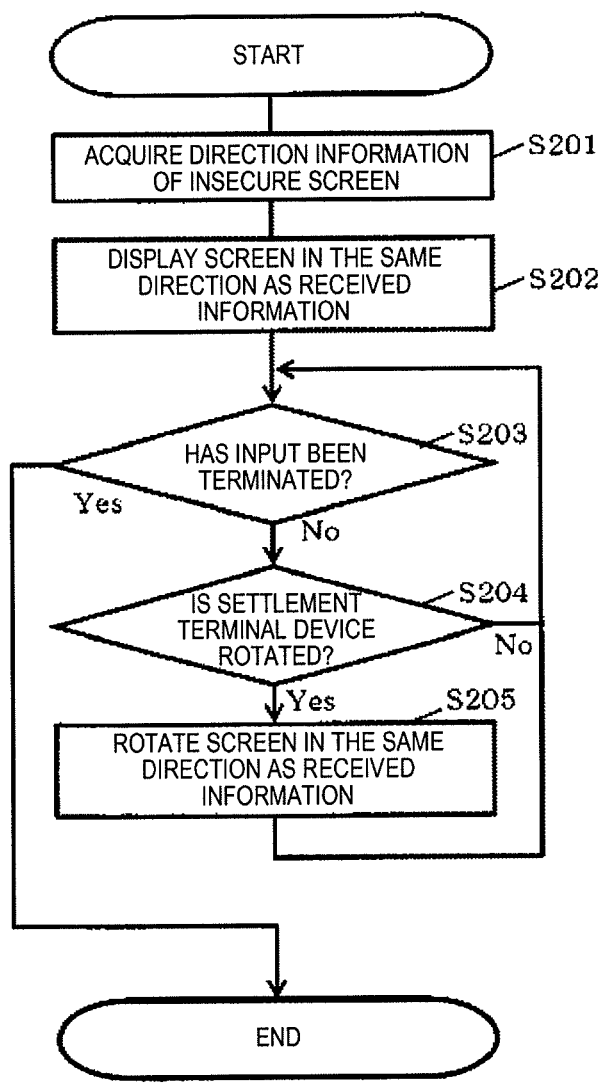

SETTLEMENT TERMINAL DEVICE AND SETTLEMENT PROCESS METHOD USING THE SAME

BACKGROUND OF THE INVENTION

1. Field of the Invention

The present invention relates to a settlement terminal device which is used in order to perform settlement or a commercial transaction and a settlement processing method using the settlement terminal device.

2. Description of the Related Art

In a credit transaction using a credit card or the like, the security of the transaction is secured by verifying whether or not a person performing the transaction is the same person as the owner of the credit card used for the transaction (identity verification). For example, the identity verification is performed by a customer signing a transaction slip, having transaction details printed thereon, which is output during a transaction process and by a store clerk visually comparing the signature and a signature written on the credit card.

When a transaction process is performed using a settlement terminal, the time for which a store clerk keeps a customer's card may be longer when the settlement terminal is located at a place distant from the store clerk and the customer. In this case, customer service may deteriorate, or an uneasy feeling may be caused for a customer. In addition, the time required for a store clerk to complete settlement in a transaction process increases, and thus the time allocated to the store clerk for performing selling activities may be limited.

Hitherto, Japanese Patent Unexamined Publication No. 2003-16536 has proposed a portable device, which is a transaction terminal device performing a settlement process requiring a customer's signature, which includes an input unit for inputting a signature and a display unit for displaying the signature which is input from the input unit.

In the transaction terminal device which is an example of the related art, an orientation of the transaction terminal device, for example, in a case where a store clerk or a customer holds the transaction terminal device is not considered. For this reason, it may be difficult to perform an input operation or a display confirming operation by the store clerk or the customer in the settlement process, depending on the orientation of the transaction terminal device.

SUMMARY OF THE INVENTION

The present invention is contrived in view of the above-mentioned situations and provides a settlement terminal device which is easily capable of performing an input operation and display confirmation in a settlement process and a settlement process method using the settlement terminal device.

According to an aspect of the present invention, there is provided a settlement terminal device of the invention being a settlement terminal that includes a plurality of information processing units. The settlement terminal device includes a first information processing unit which includes a first display unit; a secure second information processing unit which includes a second display unit; and an orientation detection unit which detects an orientation of the settlement terminal device with respect to gravity. The first information processing unit reflects a detection result of the orientation detection unit on an orientation of a first display content displayed on the first display unit. The second information processing unit determines whether or not to reflect the detection result of the orientation detection unit on an orientation of a second display content, in accordance with the second display content displayed on the second display unit.

According to another aspect of the present invention, there is provided a settlement process method of the invention being a settlement process method in a settlement terminal device that includes a first information processing unit including a first display unit and a secure second information processing unit including a second display unit. The settlement process method includes a step of detecting an orientation of the settlement terminal with respect to a direction of gravity, a step of reflecting a detection result of the orientation on an orientation of a first display content displayed on the first display unit in the first information processing unit, and a step of determining whether or not to reflect a detection result of the orientation on an orientation of a second display content, in accordance with the second display content displayed on the second display unit in the second information processing unit.

According to the present invention, it is possible to easily perform an input operation and display confirmation in a settlement process.

BRIEF DESCRIPTION OF DRAWINGS

FIG. 1A is a front view showing an example of an exterior of a settlement terminal according to a first exemplary embodiment.

FIG. 8 is a flow chart showing a first operation example during screen rotation of the settlement terminal device according to the first exemplary embodiment;

DETAILED DESCRIPTION OF THE PREFERRED EMBODIMENTS

Hereinafter, exemplary embodiments of the present invention will be described with reference to the accompanying drawings.

Background of Obtainment of Mode of the Present Invention

As in the transaction terminal device disclosed in Japanese Patent Unexamined Publication No. 2003-16536, a terminal device capable of inputting and displaying a signature is realized by, for example, a portable terminal (for example, a smartphone and a tablet terminal). A large number of such portable terminals are being distributed for customer use, and thus it is possible to construct the settlement terminal devices by supplying the portable terminals at low prices.

On the other hand, in the portable terminal, a display direction varies depending on, for example, the orientation of the portable terminal with respect to gravity. The transaction terminal device performing a settlement process may perform a settlement process in accordance with not only a customer's signature but also a personal identification number (PIN) input or other inputs. Accordingly, it is preferable that the convenience of an input and a display in the transaction terminal device is secured using any method.

Hereinafter, an information processing apparatus, an information processing method, an information processing program, and a storage medium which are capable of easily performing an input operation and display confirmation in a settlement process will be described.

First Exemplary Embodiment

Figure 1B:
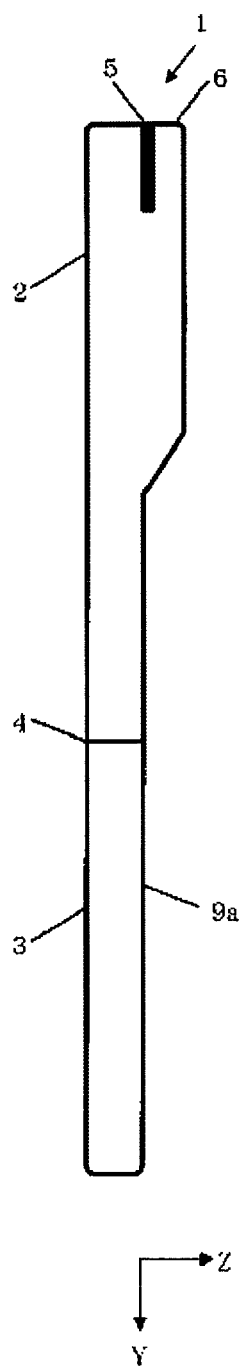
FIG. 1B is a side view showing an example of an exterior of the settlement terminal device according to the first exemplary embodiment.

FIG. 1A is a front view showing a configuration example of the exterior of settlement terminal device 1 according to a first exemplary embodiment, and FIG. 1B is a side view showing an example of the exterior of settlement terminal device 1.

Settlement terminal device 1, which is a portable type, is configured to include first information processing unit 2 and "secure" second information processing unit 3. The term "secure" used herein means tamper resistance being provided. The term "tamper resistance" used herein refers to resistance to attack of stealing information from a terminal. For example, it is possible to protect a customer's information in a settlement process and to safely perform a transaction by having tamper resistance.

Figure 2:
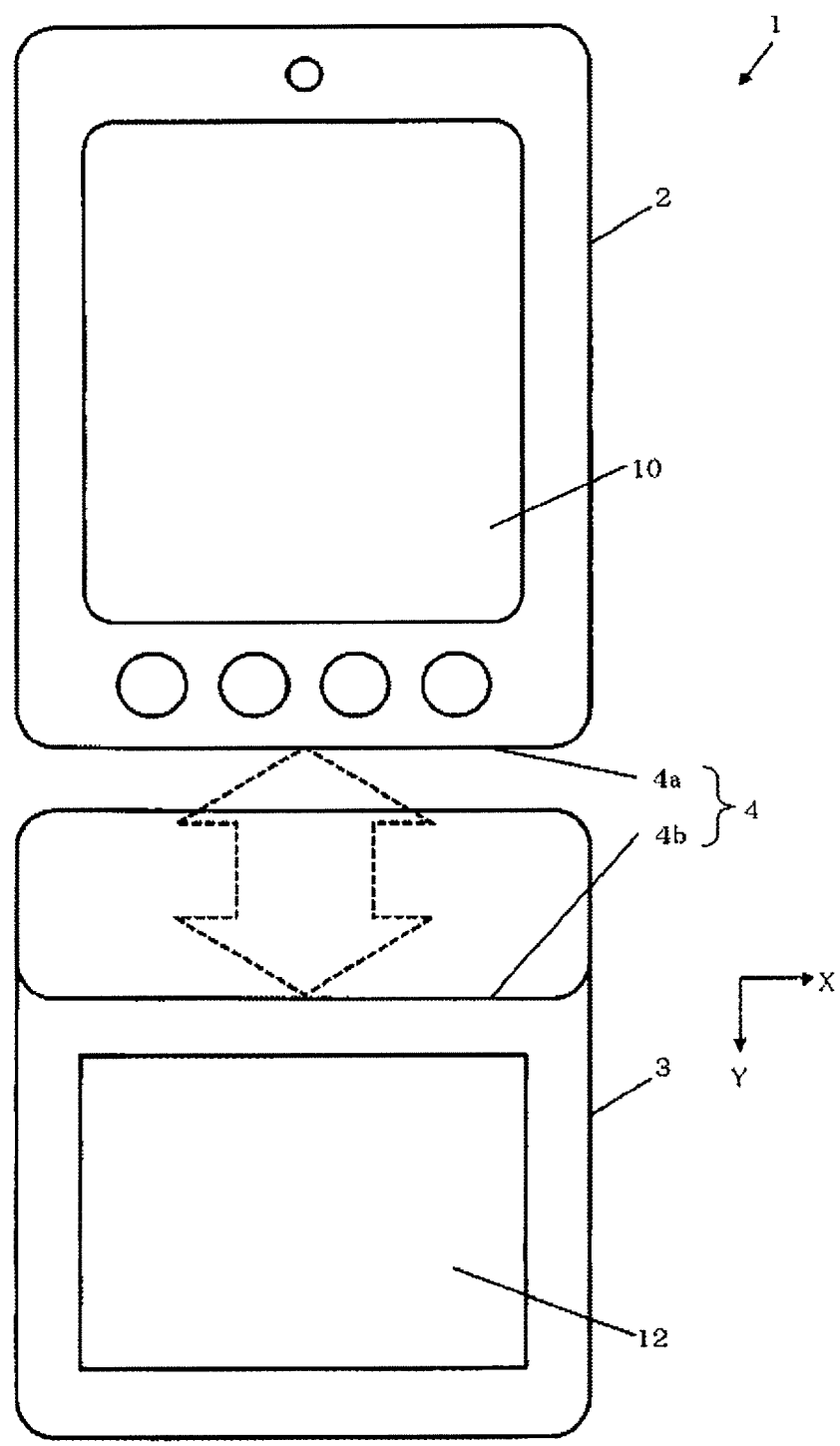
FIG. 2 is a plan view showing an example of a separated state of the settlement terminal device according to the first exemplary embodiment.

FIG. 2 is a schematic plan view showing a configuration example in a separated state of settlement terminal device 1.

In settlement terminal device 1, first information processing unit 2 and second information processing unit 3 are configured to be capable of being coupled to each other at coupling surface 4 (4a, 4b). First information processing unit 2 and second information processing unit 3 may be configured to be inseparable from each other. In addition, first information processing unit 2 may be configured to be "secure" or may be configured to be "insecure". The term "insecure" used herein means that the tamper resistance is not provided.

Settlement terminal device 1 includes slit 5 in upper side surface 6 of first information processing unit 2. In FIG. 2, upper side surface 6 of first information processing unit 2 is a surface of an end of the negative Y-axis side of first information processing unit 2. Slit 5 serves as a path into which a magnetic card slides and which is used to read a magnetic stripe of the magnetic card. Upper side surface 6 of first information processing unit 2 is a surface which is opposite to coupling surface 4b (see FIG. 2) to second information processing unit 3. Slit 5 may be provided in second information processing unit 3 instead of being provided in first information processing unit 2.

Settlement terminal device 1 includes two input units and display units, that is, two touch panels. Specifically, front face 9 (surface on negative Z-axis side) included in first information processing unit 2 is provided with first touch panel 10, and front face 11 (surface on negative Z-axis side) included in second information processing unit 3 is provided with second touch panel 12.

Figure 3:
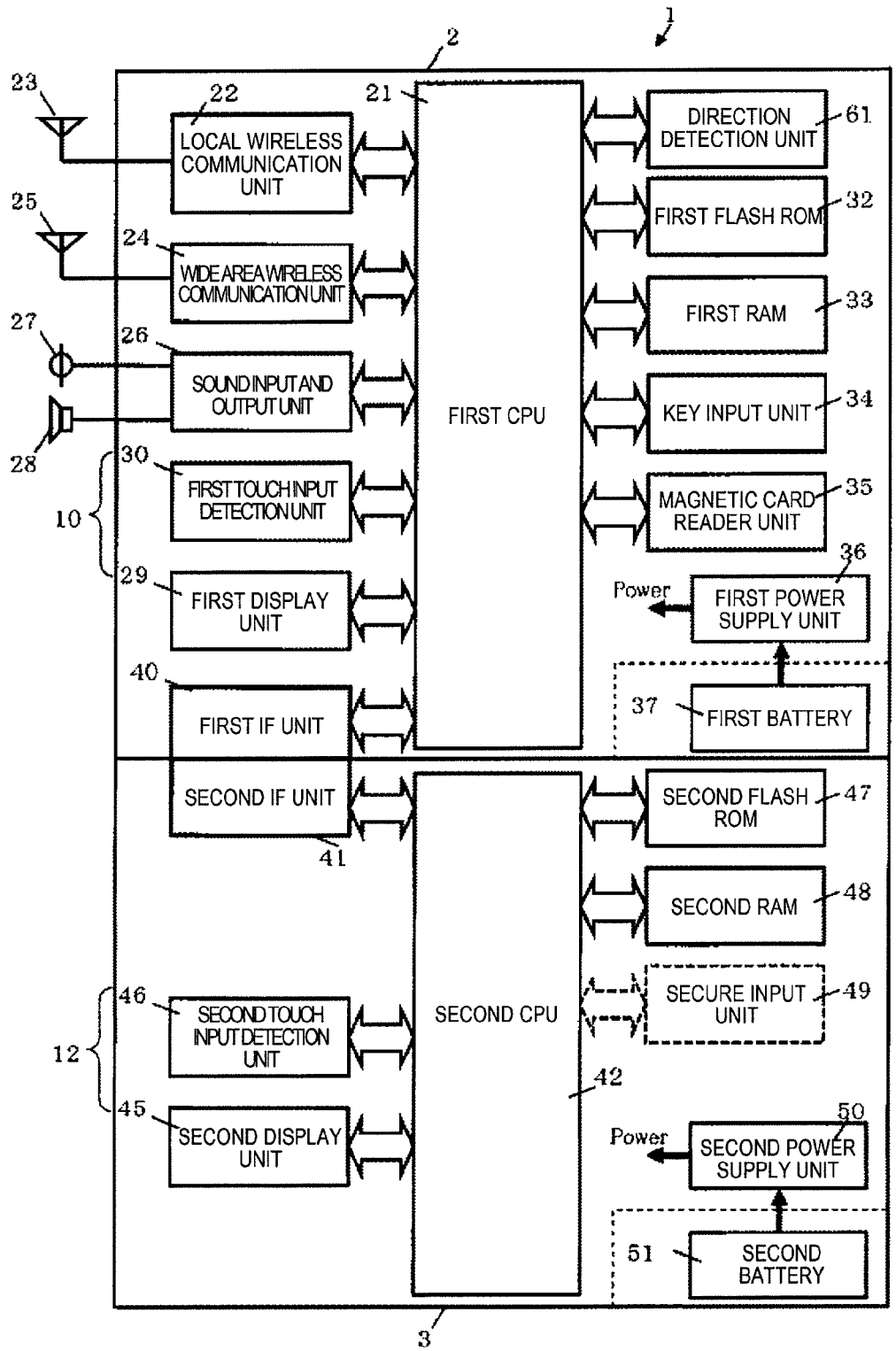
FIG. 3 is a block diagram showing a configuration example of the settlement terminal device according to the first exemplary embodiment.

FIG. 3 is a block diagram showing a configuration example of settlement terminal device 1.

Settlement terminal device 1 includes first information processing unit 2 and second information processing unit 3. First information processing unit 2 includes first central processing unit (CPU) 21, local wireless communication unit 22, wide area wireless communication unit 24, sound input and output unit 26, first display unit 29, and first touch input detection unit 30. In addition, first information processing unit 2 includes first flash read only memory (ROM) 32, first random access memory (RAM) 33, key input unit 34, magnetic card reader unit 35, first power supply unit 36, and first interface (IF). In addition, first information processing unit 2 may include orientation detection unit 61.

In first information processing unit 2, various types of components are connected to first CPU 21. First CPU 21 controls the overall first information processing unit 2 and performs, for example, various types of control, processing, setting, determination, decision, and confirmation.

Local wireless communication unit 22 is connected to local wireless communication antenna 23 and has a function of performing, for example, wireless LAN communication using a local wireless communication path not shown in the drawing. Local wireless communication unit 22 may perform communication (for example, Bluetooth (registered trademark) communication) other than wireless LAN communication.

Wide area wireless communication unit 24 is connected to wide area wireless communication antenna 25 and has a function of performing communication through a wide area wireless communication path (for example, wide area network (WAN)) not shown in the drawing. The communication through the wide area wireless communication path may be performed using mobile communication such as, for example, wideband code division multiple access (W-CDMA), a universal mobile telecommunications system (UMTS), code division multiple access (CDMA) 2000, or long term evolution (LTE).

Sound input and output unit 26 is connected to microphone 27 and speaker 28 and has a function of controlling an input and output of sound. A call with another mobile phone or a fixed telephone is enabled using, for example, sound input and output unit 26, microphone 27, speaker 28, and a radio telephone line communication unit (not shown). In addition, speaker 28 is also used to generate sound for attracting user's attention and a warning sound indicating an operation error, for example, when the user (a store clerk or a customer) operates settlement terminal device 1.

First display unit 29 has a function of controlling a display of first touch panel 10 (see FIGS. 1A and 1B). First touch input detection unit 30 has a function of detecting a touch input to first touch panel 10.

First flash ROM 32 has a function of storing various types of pieces of data. The stored data may be data regarding business affairs or may be a program for controlling settlement terminal device 1 (for example, first information processing unit 2).

First RAM 33 is a memory which is used to temporarily store processing data generated in the middle of a computation process, for example, when the computation process associated with the operation of settlement terminal device 1 (for example, first information processing unit 2) is performed.

Key input unit 34 has a function of receiving an input, for example, from input key 13 shown in FIGS. 1A and 1B. Magnetic card reader unit 35 is disposed inside slit 5 in FIGS. 1A and 1B and has a function of reading a magnetic stripe of a magnetic card.

First power supply unit 36, which is mainly a power supply of first information processing unit 2, receives the supply of power from first battery 37 and supplies power to units (for example, first CPU 21) of first information processing unit 2. First CPU 21 can supply power and stop supplying power to some or all of the circuits constituting first information processing unit 2 by controlling first power supply unit 36. First CPU 21 may supply power to second information processing unit 3 by controlling first power supply unit 36.

First information processing unit 2 and second information processing unit 3 are connected to each other through first interface unit (hereinafter, "first IF unit") 40 and second interface unit (hereinafter, "second IF unit") 41 so that various pieces of data and commands are transferred. First IF unit 40 and second IF unit 41 can be coupled to each other.

Second information processing unit 3 includes second IF unit 41, second CPU 42, second display unit 45, second touch input detection unit 46, second flash ROM 47, second RAM 48, secure input unit 49, and second power supply unit 50. In this exemplary embodiment, the orientation detection unit is provided in first information processing unit 2, but may be provided in second information processing unit 3 instead.

In second information processing unit 3, various types of components are connected to second CPU 42. Second CPU 42 controls the overall second information processing unit 3, and performs, for example, various types of control, processing (for example, a settlement process), setting, determination, decision, confirmation, authentication, collation (for example, collation of a PIN and a signature).

Second display unit 45 has a function of controlling a display of second touch panel 12 (see FIG. 1). Second touch input detection unit 46 has a function of detecting a touch input to second touch panel 12.

Second flash ROM 47 has a function of storing various types of pieces of data. The stored data may be data regarding business affairs or may be a program for controlling settlement terminal device 1 (for example, second information processing unit 3).

Second RAM 48 is a memory which is used to temporarily store processing data generated in the middle of a computation process, for example, when the computation process associated with the operation of settlement terminal device 1 (for example, second information processing unit 3) is performed.

Secure input unit 49 may have, for example, physical keys or soft keys for inputting a PIN. For example, a signature may be input to secure input unit 49. The PIN may be input to secure input unit 49 by writing by hand using, for example, a finger or a stylus pen.

Secure input unit 49 is not shown in FIGS. 1A and 1B and FIG. 2, but may be disposed on a back face 9a (surface on the positive Z-axis side) of second information processing unit 3 in FIGS. 1A and 1B. Back face 9a of second information processing unit 3 is a surface which is located on the opposite side to second information processing unit 3 in the Z-axis direction with respect to front face 9 (display surface) on which second touch panel 12 is provided.

Second power supply unit 50, which is mainly a power supply of second information processing unit 3, receives the supply of power from second battery 51 and supplies power to units (for example, second CPU 42) of second information processing unit 3. Second CPU 42 can supply power and stop supplying power to some or all of the circuits constituting second information processing unit 3 by controlling second power supply unit 50. Second CPU 42 may supply power to first information processing unit 2 by controlling second power supply unit 50.

In addition, settlement terminal device 1 includes orientation detection unit 61 that detects the orientation of settlement terminal device 1 with respect to gravity. For example, orientation detection unit 61 is provided in at least one of first information processing unit 2 and second information processing unit 3. Orientation detection unit 61 includes, for example, an acceleration sensor. FIG. 3 shows that orientation detection unit 61 is provided in first information processing unit 2.

According to the configuration of settlement terminal device 1, "secure" or "insecure" first information processing unit 2 and "secure" second information processing unit 3 can be coupled to each other. An input and display of authentication information (for example, a signature and PIN information) of a card used for settlement are performed on second touch panel 12 included in "secure" second information processing unit 3. Accordingly, settlement terminal device 1 can input and display the authentication information of the card used for settlement and can also secure "tamper resistance". A "secure" portion requiring "tamper resistance" is localized in second information processing unit 3.

On the other hand, for example, information terminals (for example, smartphones and tablet terminals) which are being distributed for customer use in great numbers may be used as first information processing unit 2. For example, a general-purpose operating system (OS) is adopted as a software platform in first information processing unit 2.

Accordingly, the reuse and recycling of development assets of application software for settlement (hereinafter, "settlement application") and application software used for other business affairs (hereinafter, "business application") are facilitated. In addition, the settlement application and other business applications are processed by, for example, first information processing unit 2 having a high computation processing ability, and thus are flexibly operated without stress.

In addition, it is possible to suppress increases in the development cost and price of settlement terminal device 1 for which settlement schemes have diversified.

Figure 4:
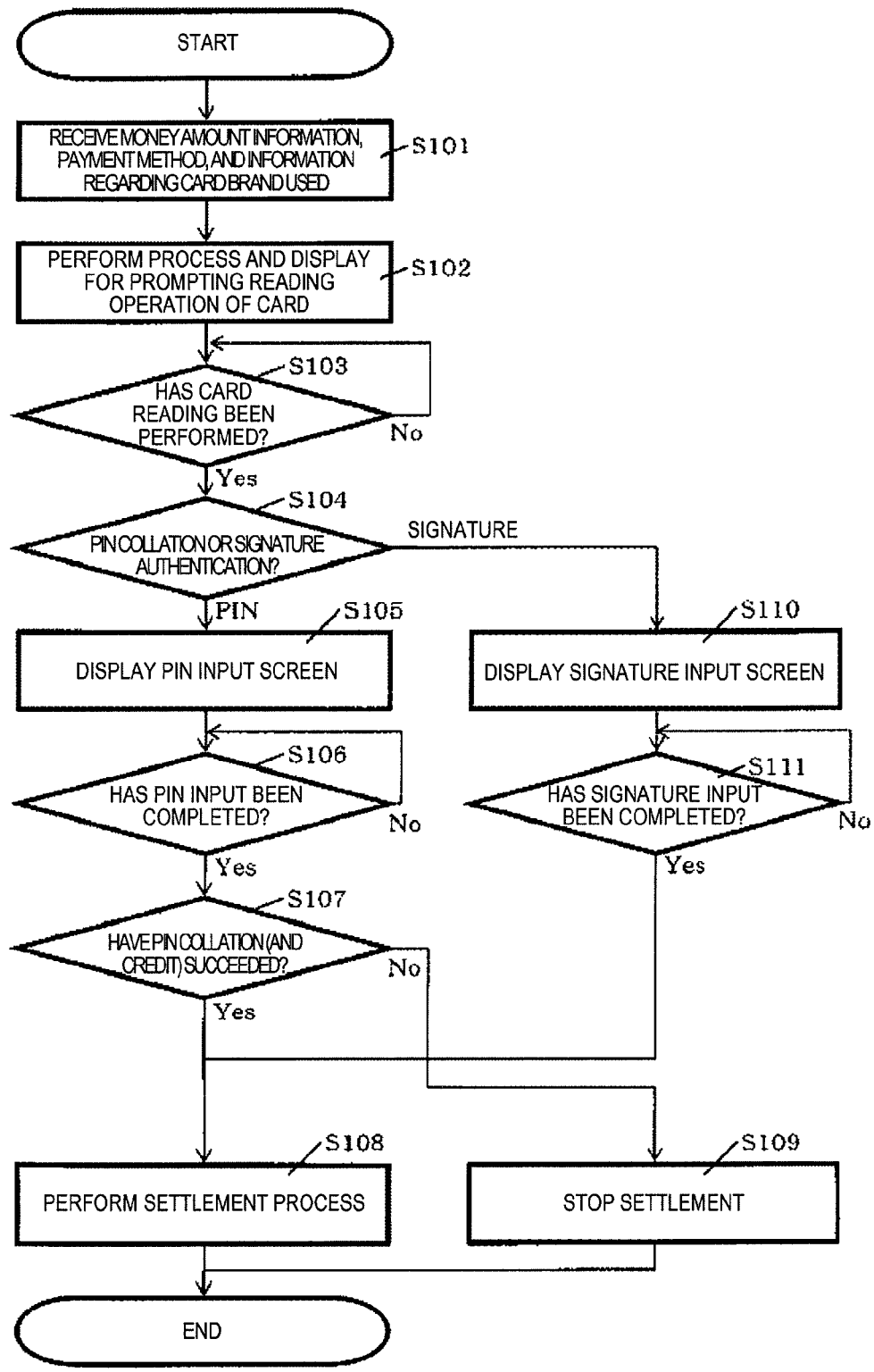
FIG. 4 is a flow chart showing an example of a settlement process flow using the settlement terminal device according to the first exemplary embodiment.

FIG. 4 is a flow chart showing an example of a settlement process flow using settlement terminal device 1.

In the settlement process flow shown in FIG. 4, settlement terminal device 1 starts a settlement procedure by executing a settlement application, not shown in the drawing, which is installed in first information processing unit 2 (see FIGS. 1A and 1B to FIG. 3 and the like). Settlement terminal device 1 receives information regarding settlement (for example, money amount information, a payment method, and information regarding a card brand used for settlement) by an input to the settlement application or from outside of settlement terminal device 1 (step S101).

When settlement terminal device 1 receives the information regarding settlement, first CPU 21 and first touch panel 10 perform a process and display for prompting a reading operation of a card used for settlement, for example, as shown in FIGS. 1A and 1B (step S102).

The process and display for prompting a reading operation of a card used for settlement are performed until it is confirmed that the reading of the card has been performed ("No" in step S103). When it is confirmed that the reading of the card has been performed ("Yes" in step S103), settlement terminal device 1 proceeds to a process of authenticating the card.

A method of authenticating the card is determined on the basis of, for example, the type of card used for settlement, information on the card, or contract made between a member store (credit card member store handling a credit card transaction) which uses settlement terminal device 1 and a settlement center.

When the authentication method is performed using a PIN ("PIN" in step S104), settlement terminal device 1 performs a display of a PIN input screen on second touch panel 12 disposed in second information processing unit 3 (step S105), and waits for a PIN input performed by a card user (customer) to be completed ("No" in step S106). The PIN input screen is a screen, for example, shown in FIGS. 5A and 5B, which is capable of allowing input of a PIN. For example, the display of the PIN input screen is performed until it is confirmed that the input of the PIN has been completed.

When it is confirmed that the input of the PIN has been completed ("Yes" in step S106), settlement terminal device 1 waits for a result of collation regarding whether or not the PIN input matches a PIN registered in the card used for settlement or a PIN registered in a settlement center ("No" in step S107).

The collation between the PINs is performed in, for example, a settlement center. Settlement terminal device 1 encrypts the PIN which is input in step S106 and transmits the encrypted PIN to the settlement center, together with card information.

The settlement center decrypts the PIN received from settlement terminal device 1 and collates the decrypted PIN with a PIN which is managed in the settlement center. When it is confirmed that the two PINs match each other and the card having the card information transmitted together with the PIN has no problem in performing a transaction (for example, the card is not blacklisted) (YES in step S107), the settlement center provides credit to settlement terminal device 1.

Settlement terminal device 1 receives credit from the settlement center and performs a sales process as the subsequent settlement process (step S108), and then terminates the communication with the settlement center. Settlement terminal device 1 may transmit data of the sales process to the settlement center until the communication with the settlement center is terminated after the sales process is completed, or may transmit the data later along with sales processing data of other settlements.

When the two PINs match each other (NO in step S107), the settlement center gives notice that credit to settlement terminal device 1 cannot be provided. Settlement terminal device 1 receives the notice from the settlement center and does not perform a sales process, and then the settlement is stopped (step S109).

When the authentication method is performed using a PIN, the collation between the PINs may be performed between settlement terminal device 1 and a credit card (not shown) which is read to settlement terminal device 1. When the collation result showing that the PIN input in step S106 matches a PIN which is recorded in advance in a chip (not shown) within the credit card is obtained from the chip within the credit card (YES in step S107), settlement terminal device 1 performs a sales process as the subsequent settlement process (step S108).

Settlement terminal device 1 may transmit the data of the sales process to the settlement center immediately after the sales process is completed and before the communication with the settlement center is terminated, or may transmit the data later along with sales processing data of other settlements. When a collation result showing that the two PINs do not match each other is obtained (NO in step S107), the sales process in settlement terminal device 1 is stopped, and the settlement is stopped (step S109).

When the authentication method is performed using a signature ("signature" in step S104), settlement terminal device 1 performs a display of a signature input screen on second touch panel 12 disposed in second information processing unit 3 (step S110), and waits for a signature input performed by a card user to be completed ("No" in step S111). The signature input screen is a screen, for example, shown in FIGS. 6A and 6B and FIGS. 7A and 7B, which is capable of allowing input of a signature. For example, the display of the signature input screen is performed until it is confirmed that the input of the signature has been completed. When it is confirmed that the input of the signature has been completed ("Yes" in step S111), settlement terminal device 1 performs a settlement process (step S108).

When the method of authenticating the credit card is performed using a signature in step S104 (signature in step S104), settlement terminal device 1 first performs a credit inquiry of the settlement. When the settlement terminal device receives notice (credit) that the credit inquiry has succeeded, the settlement terminal device may perform a sales process and then display a screen capable of inputting a signature.

An operation example shown in FIG. 4 is performed by cooperation between first information processing unit 2 included in settlement terminal device 1 and "secure" second information processing unit 3. The settlement application is executed in first information processing unit 2. A display of information regarding settlement (for example, money amount information, a payment method, and information regarding a card brand used for settlement) and a display for prompting a reading operation of a card used for settlement may be performed in either first information processing unit 2 or "secure" second information processing unit 3.

On the other hand, a display of the PIN input screen or the signature input screen is performed by second touch panel 12 disposed in "secure" second information processing unit 3. The display of the PIN input screen or the signature input screen is performed until an input of a PIN or a signature performed by a card user is completed after the display for prompting the reading operation of the card used for settlement and then the reading of the card used are performed.

As described above, settlement terminal device 1 can input and display authentication information (for example, a signature or a PIN) of a card used for settlement by a customer and can also secure "tamper resistance". Application software for settlement can be flexibly operated without stress.

Next, display examples of first touch panel 10 and second touch panel 12 will be described.

Figure 5A:
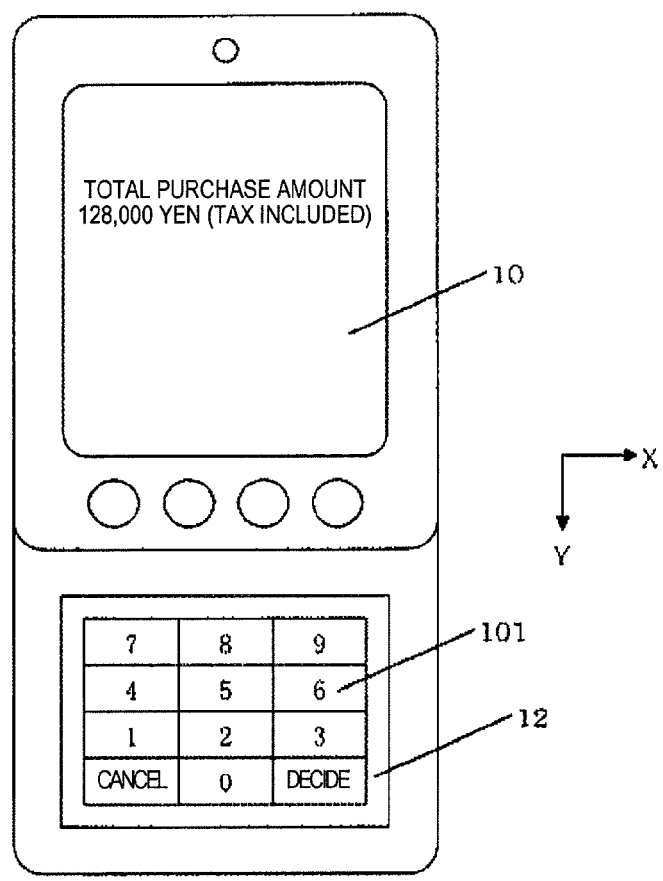
FIGS. 5A and 5B are schematic diagrams showing a display example of money amount information and a display example of a personal identification number (PIN) input screen in the settlement terminal device according to the first exemplary embodiment.
Figure 5B:
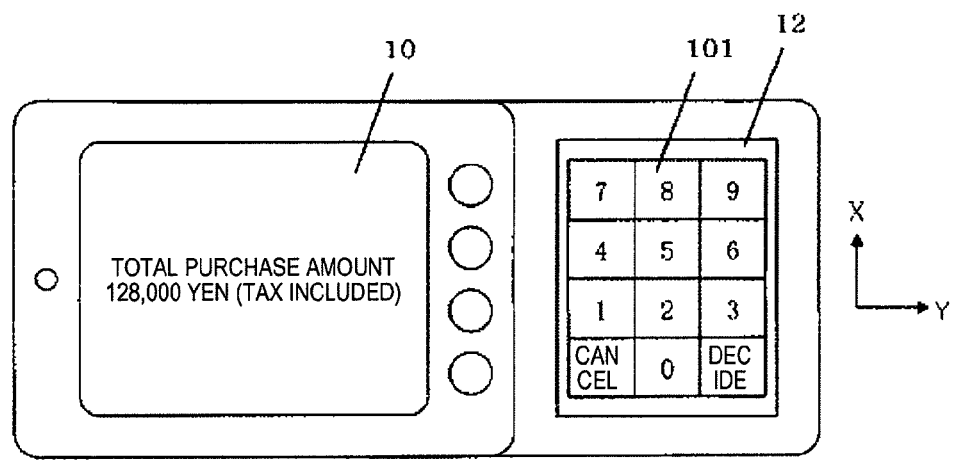

FIGS. 5A and 5B are schematic diagrams showing a display example of money amount information and a display example of PIN input screen 101 in settlement terminal device 1. In FIGS. 5A and 5B, first touch panel 10 displays, for example, money amount information, and second touch panel 12 displays, for example, PIN input screen 101. In FIG. 5A and FIG. 5B, display directions and input directions (for example, an array of keys for inputting a PIN) with respect to settlement terminal device 1 are different from each other. The differences in the display and input directions depend on the orientation of settlement terminal device 1.

For example, in FIG. 5A, the gravity is downward (positive Y-axis direction). In this case, first display unit 29 and second display unit 45 control the orientation of a display content so that the positive Y-axis side is set to be a lower side in the display content. For example, first display unit 29 and second display unit 45 align a display direction of characters so that the positive Y-axis side is set to be a lower side of the characters. First touch panel 10 and second touch panel 12 display a screen in which the orientation of the display content is controlled. Thereby, for example, as in FIG. 5A, a user can easily view the money amount information and PIN input screen 101 even when the orientation of settlement terminal device 1 is set to a portrait orientation.

In FIG. 5B, the gravity is downward (negative X-axis direction). The state of FIG. 5B is a state where settlement terminal device 1 is rotated counterclockwise by 90 degrees from the state of FIG. 5A. In FIG. 5B, first touch panel 10 is located on the left side in settlement terminal device 1, and second touch panel 12 is located on the right side in settlement terminal device 1. In this case, first display unit 29 and second display unit 45 control the orientation of a display content so that the negative X-axis side is set to be a lower side in the display content. First touch panel 10 and second touch panel 12 display a screen in which the orientation of the display content is controlled. In addition, the control of the display content includes the control of a PIN array, and the orientation of the PIN array with respect to the direction of gravity in FIG. 5A is the same as that in FIG. 5B.

Thereby, for example, as in FIG. 5B, even when the orientation of settlement terminal device 1 is set to a landscape orientation, a user can easily view the money amount information and PIN input screen 101. For example, when settlement terminal device 1 is merely rotated, the orientation of a display content is rotated and displayed with respect to gravity. However, it is possible to avoid the rotation of the display content with respect to gravity, and a user's settlement operation and settlement confirmation are facilitated.

Switching between the orientation of the display content shown in FIG. 5A and the orientation of the display content shown in FIG. 5B may be discontinuously performed. For example, when orientation detection unit 61 (see FIG. 3) detects that settlement terminal device 1 is rotated counterclockwise by more than 45 degrees from the state of FIG. 5A, first display unit 29 and second display unit 45 of settlement terminal device 1 may convert the direction of the a display content into that in the state of FIG. 5B.

In addition, even when orientation detection unit 61 (see FIG. 3) detects the rotation of settlement terminal device 1 before a PIN input is completed after the PIN input is started, first display unit 29 and second display unit 45 may perform control so as not to change an orientation direction of first touch panel 10 or second touch panel 12. Thereby, the direction of a PIN input or a signature input is also not changed until the input is completed, and thus a user easily performs the settlement operation and the settlement confirmation without being bewildered during the PIN input or the signature input.

Figure 6A:
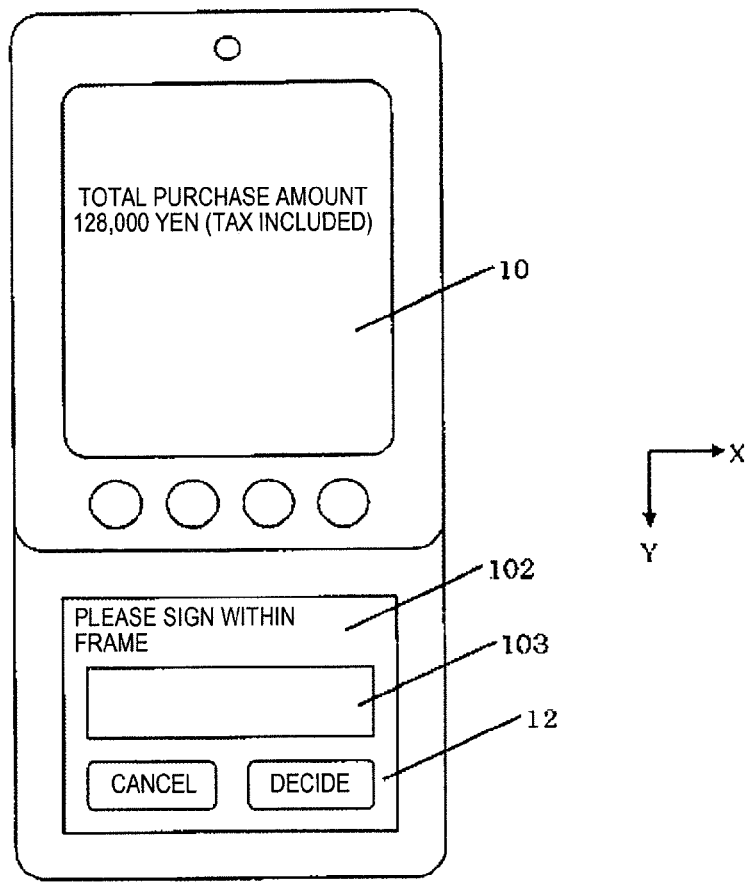
FIGS. 6A and 6B are schematic diagrams showing a first display example of money amount information and a first display example of a signature input screen in the settlement terminal device according to the first exemplary embodiment.
Figure 6B:
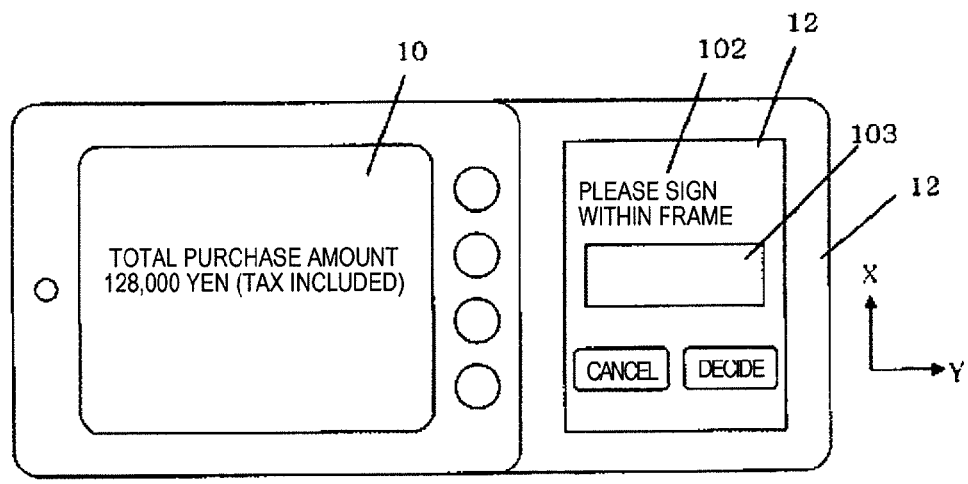

FIGS. 6A and 6B are schematic diagrams showing a display example of money amount information and a display example of signature input screen 102 in settlement terminal device 1. In FIGS. 6A and 6B, first touch panel 10 displays, for example, money amount information, and second touch panel 12 displays, for example, signature input screen 102. In FIGS. 6A and 6B, display directions and input directions (for example, the direction of an input to signature input box 103) with respect to settlement terminal device 1 are different from each other. The differences in the display and input directions depend on the orientation of settlement terminal device 1 with respect to gravity. Here, differences from FIGS. 5A and 5B will be mainly described.

In FIG. 6A, the gravity is downward (positive Y-axis direction). In FIG. 6A, second display unit 45 controls the position and orientation of signature input box 103 to be displayed in second touch panel 12, and second touch input detection unit 46 controls an input detection direction (for example, a reading direction of input characters), as compared with FIG. 5A. In FIG. 6A, the input characters in signature input box 103 are read toward the positive X-axis side from the negative X-axis side.

Thereby, for example, as in FIG. 6A, even when the orientation of settlement terminal device 1 is set to a portrait orientation, a user can easily view money amount information and signature input screen 102 and input a signature.

In FIG. 6B, the gravity is downward (negative X-axis direction). In FIG. 6B, second display unit 45 controls the position and orientation of signature input box 103 to be displayed in second touch panel 12, and second touch input detection unit 46 controls an input detection direction (for example, a reading direction of input characters), as compared with FIG. 5B. In FIG. 6B, the input characters in signature input box 103 are read toward the positive Y-axis side from the negative Y-axis side.

Thereby, for example, as in FIG. 6B, even when the orientation of settlement terminal device 1 is set to a landscape orientation, a user can easily view money amount information and signature input screen 102 and input a signature.

Switching between the orientation of the display content shown in FIG. 6A and the orientation of the display content shown in FIG. 6B may be discontinuously performed. For example, when orientation detection unit 61 (see FIG. 3)

detects that settlement terminal device 1 is rotated counterclockwise by more than 45 degrees from the state of FIG. 6A, first display unit 29 and second display unit 45 of settlement terminal device 1 may convert the orientation of the display content into that in the state of FIG. 6B.

In addition, even when orientation detection unit 61 (see FIG. 3) detects the rotation of settlement terminal device 1 before a signature input is completed after the signature input is started, first display unit 29 and second display unit 45 may perform control so as not to change an orientation direction of first touch panel 10 or second touch panel 12. Thereby, the direction of a PIN input or a signature input is also not changed until the input is completed, and thus a user easily performs a settlement operation and settlement confirmation without being bewildered during the PIN input or the signature input.

Figure 7A:
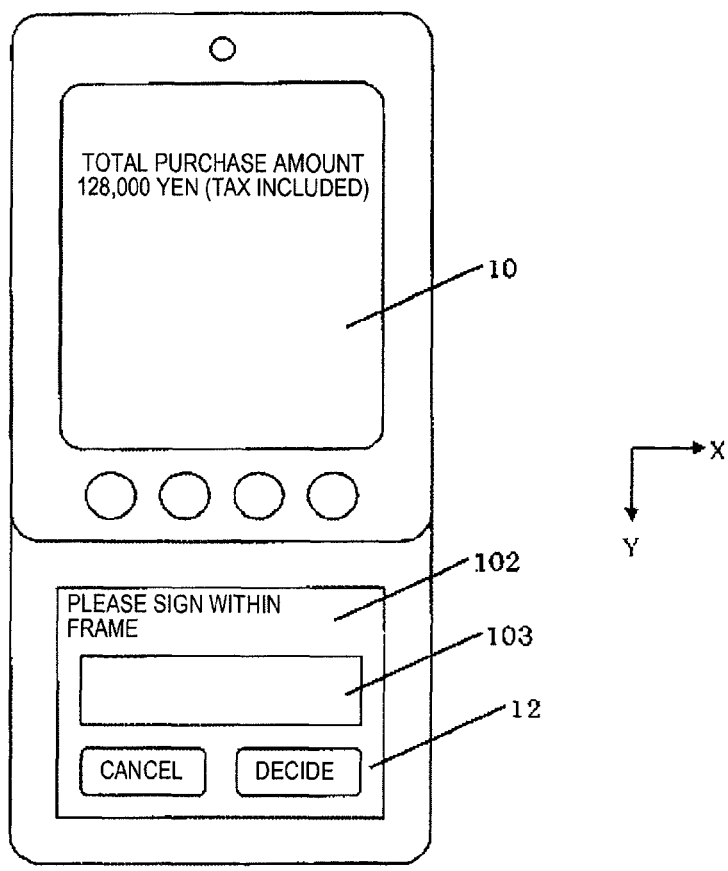
FIGS. 7A and 7B are schematic diagrams showing a second display example of money amount information and a second display example of a signature input screen in the settlement terminal device according to the first exemplary embodiment.
Figure 7B:
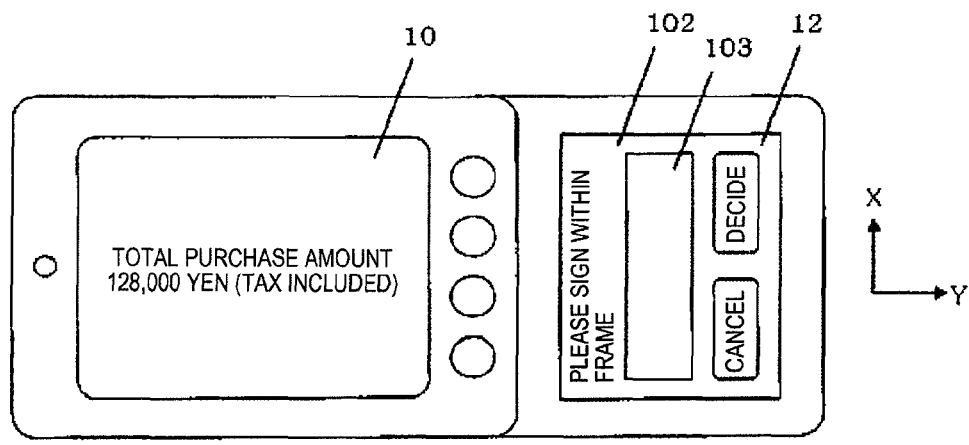

FIGS. 7A and 7B are schematic diagrams showing a display example of money amount information and a display example of signature input screen 102 in settlement terminal device 1 and are modified examples of FIGS. 6A and 6B.

In FIG. 7A, the gravity is downward (positive Y-axis direction). FIG. 7A is the same as FIG. 6A.

In FIG. 7B, the gravity is downward (negative X-axis direction). In FIG. 7B, a display direction and an input direction in signature input screen 102 do not depend on the direction of gravity, as compared with FIG. 6B. In this case, even when settlement terminal device 1 is rotated counterclockwise by 90 degrees from the state of FIG. 7A, the display direction and the input direction in signature input screen 102 are not changed.

Accordingly, in FIG. 7A, the lower side (negative X-axis direction side) of a display content of signature input screen 102 matches the direction (negative X-axis direction) of gravity. However, in FIG. 7B, the lower side (positive Y-axis direction side) of a display content of signature input screen 102 does not match the direction (negative X-axis direction) of gravity. For example, when a length sufficient to allow easy signature formation can be secured as the length of signature input box 103 in the longitudinal direction, the display direction and the input direction in signature input screen 102 are more preferably controlled to have the orientations shown in FIGS. 7A and 7B than to have the orientations shown in FIGS. 6A and 6B.

The display direction and the input direction in signature input screen 102 may be determined to be those of either FIGS. 6A and 6B or FIGS. 7A and 7B in accordance with a screen size or an aspect ratio of second touch panel 12.

For example, when the aspect ratio of second touch panel 12 is greater than a predetermined value, signature input screen 102 may not be rotated in association with the display direction in first touch panel 10, as shown in FIG. 7B.

In the state shown in FIG. 7A, signature input box 103 of signature input screen 102 is set to be in a horizontally long state, and thus a horizontal signature input is facilitated. When the number of characters of a signal to be input is large, it is particularly useful to sufficiently secure the length of signature input box 103 in the input direction.

On the other hand, as shown in FIG. 6B, when signature input screen 102 is rotated in association with the display direction in first touch panel 10, there is the possibility of the length of signature input box 103 of signature input screen 102 not being able to be sufficiently secured with respect to the input direction (Y-axis direction) in the state shown in FIG. 6B. Accordingly, as shown in FIG. 7B, it is preferable that signature input screen 102 is not rotated in association with the display direction in first touch panel 10 in order to secure a sufficient length of signature input box 103 in the input direction. In this case, similarly to FIG. 7A, the signature input is performed in the X-direction.

In addition, for example, when the aspect ratio of second touch panel 12 is less than the predetermined value, the length of signature input screen 102 in the input direction does not show too great a difference between the state shown in FIG. 6A and the state shown in FIG. 6B. That is, too great a difference is not shown between the input direction (X-axis direction) of signature input screen 102 in the state shown in FIG. 6A and the input direction (Y-axis direction) of signature input screen 102 in the state shown in FIG. 6B.

Therefore, signature input screen 102 may be rotated in association with the display direction in first touch panel 10 as shown in FIG. 6B, and may not be rotated in association with the display direction in first touch panel 10 as shown in FIG. 7B.

When the orientation of the display content displayed on second touch panel 12 is changed in accordance with the orientation of settlement terminal device 1 with respect to gravity, it is possible to fix the orientation of signature input screen 102 with respect to a user, irrespective of the orientation in which the user holds settlement terminal device 1. Therefore, it is possible to easily perform a signature input operation and display confirmation in a settlement process and to improve user convenience.

Next, an operation example during screen rotation of settlement terminal device 1 will be described.

FIG. 8 is a flow chart showing a first operation example during screen rotation of settlement terminal device 1. In FIG. 8, it is assumed that first information processing unit 2 includes orientation detection unit 61. In FIG. 8, it is assumed that first information processing unit 2 is an insecure information processing unit.

When orientation detection unit 61 detects the orientation of settlement terminal device 1 with respect to gravity, first display unit 29 reflects a result of the detection performed by orientation detection unit 61 on the orientation of a first display content displayed on first touch panel 10. For example, as shown in FIG. 6B, first display unit 29 controls the orientation of a first display content (for example, money amount information) so that the direction of gravity matches the lower side of the display content.

Second information processing unit 3 acquires orientation information (orientation information of the first display content) of an insecure screen (first touch panel 10) through first IF unit 40 and second IF unit 41 (step S201). In addition, second information processing unit 3 may acquire orientation information of settlement terminal device 1 from orientation detection unit 61 in first information processing unit 2.

Subsequently, second display unit 45 displays a screen on second touch panel 12 with the same orientation as the orientation of the insecure screen in accordance with the orientation information of the insecure screen (step S202). Here, second display unit 45 performs a display so that the lower side of a second display content displayed on second touch panel 12 is set to be a gravity action side.

Subsequently, second CPU 42 determines whether or not a user's input through second touch panel 12 has been terminated (step S203). When the user's input has been terminated, the process of FIG. 8 is terminated. When the user's input has not been terminated, second CPU 42 acquires orientation information of the insecure screen again and determines whether or not settlement terminal device 1 is rotated (step S204). In other words, it is determined whether or not settlement terminal device 1 is rotated in the middle of the input. When the settlement terminal device is not rotated, the process returns to step S203, and the input is continued.

When settlement terminal device 1 is rotated, second display unit 45 rotates and displays a screen in accordance with the rotation orientation of settlement terminal device 1 (step S205). In this case, as shown in FIGS. 5A and 5B, when settlement terminal device 1 is rotated counterclockwise by 90 degrees, that is, when the first display content is rotated clockwise by 90 degrees, the second display content (for example, PIN input screen 101 and signature input screen 102) is rotated clockwise by 90 degrees. In other words, for example, the second display content is rotated by the same angle and with the same orientation as the first display content and is rotated in the opposite direction to the rotation orientation of settlement terminal device 1.

According to the operation example of FIG. 8, since a screen is displayed depending on a result of the orientation detection performed by orientation detection unit 61, it is possible to fix the orientation of the screen with respect to a user, irrespective of the orientation in which the user holds settlement terminal device 1 as shown in FIGS. 6A and 6B. In addition, it is possible to adjust the orientation of second touch panel 12 to the orientation of first touch panel 10. Therefore, it is possible to easily perform an input operation and display confirmation in a settlement process and to improve user convenience.

Figure 9:
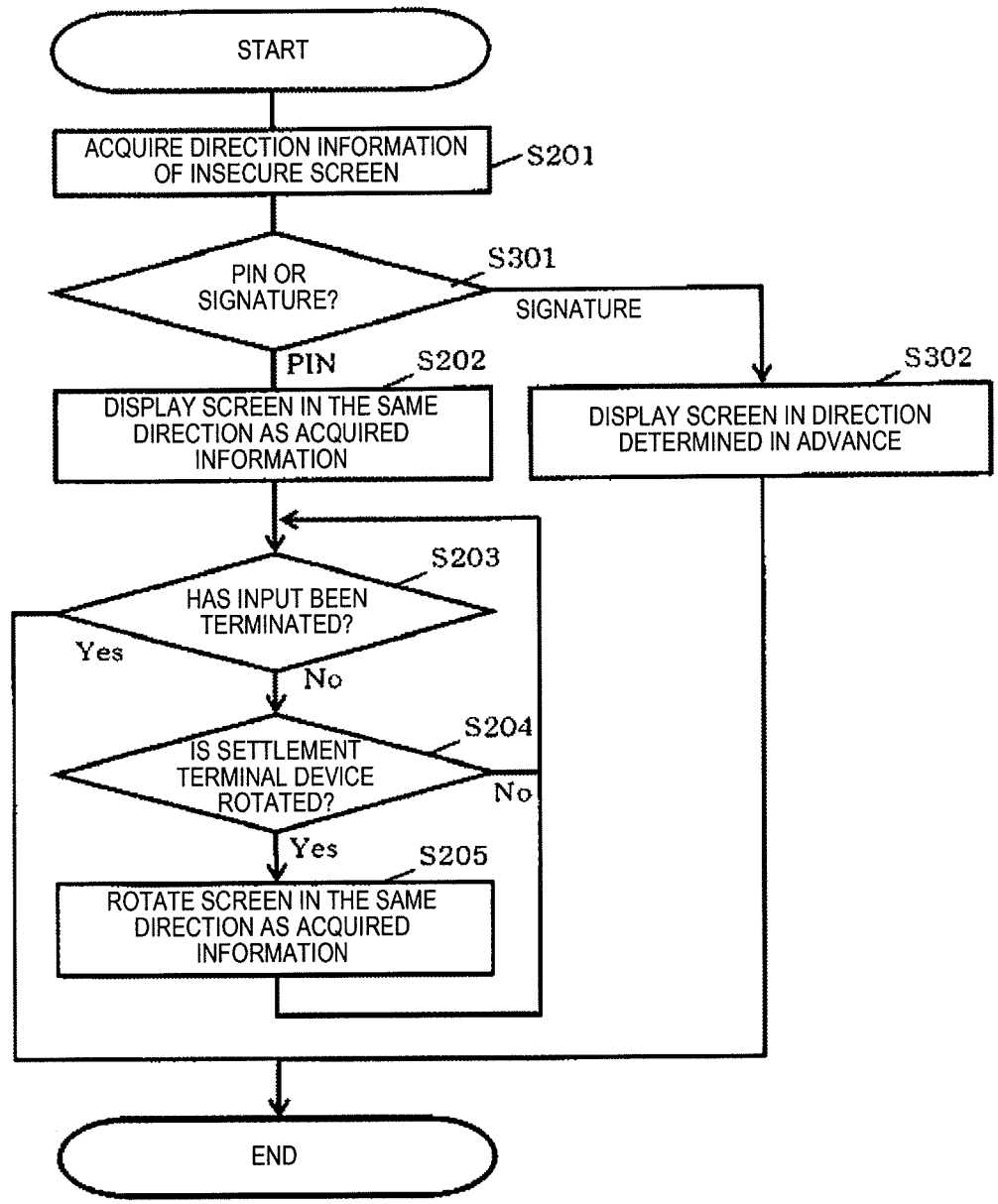
FIG. 9 is a flow chart showing a second operation example during screen rotation of the settlement terminal device according to the first exemplary embodiment.

FIG. 9 is a flow chart showing a second operation example during screen rotation of settlement terminal device 1. In FIG. 9, it is assumed that first information processing unit 2 includes orientation detection unit 61. In FIG. 9, steps of performing the same processes as the steps of FIG. 8 will be denoted by the same reference numerals and signs, and a description thereof will be omitted or simplified.

First, second information processing unit 3 performs the process of step S201.

Subsequently, second CPU 42 determines whether or not a second display content displayed on second touch panel 12 includes PIN input screen 101 or signature input screen 102 (step S301).

When the second display content includes PIN input screen 101, second information processing unit 3 performs the processes of step S202 to step S205. On the other hand, when the second display content includes signature input screen 102, second display unit 45 displays a screen with an orientation determined in advance as the second display content, as shown in FIG. 7B (step S302).

The orientation determined in advance means that the input direction of signature input screen 102 is determined so as to be necessarily the same direction with respect to settlement terminal device 1. For example, the "orientation determined in advance" in FIGS. 7A and 7B means that the input direction of signature input screen 102 is determined to be necessarily the X-axis direction. This direction does not depend on the orientation of settlement terminal device 1 with respect to gravity.

Whether settlement terminal device 1 performs the first operation example shown in FIG. 8 or performs the second operation example shown in FIG. 9 is determined, for example, during the manufacture or shipment of settlement terminal device 1 or is determined by user setting.

According to the operation example of FIG. 9, during a signature input, a screen is displayed in a fixed orientation with respect to settlement terminal device 1 without depending on a result of the orientation detection performed by orientation detection unit 61. Accordingly, for example, even when the orientation in which a user holds settlement terminal device 1 is changed, it is possible to suppress a frequent change in the orientation of the signature input screen with respect to settlement terminal device 1 and to improve user convenience. A display in the orientation determined in advance may be performed not only on signature input screen 102 in FIGS. 7A and 7B but also on PIN input screen 101 in FIGS. 5A and 5B.

Figure 10:
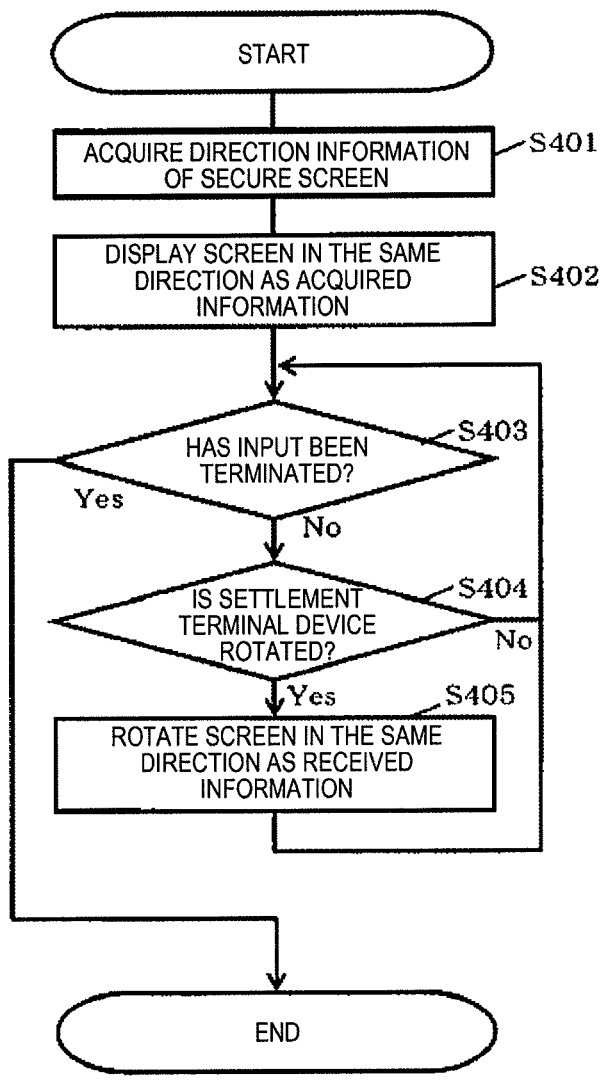
FIG. 10 is a flow chart showing a third operation example during screen rotation of the settlement terminal device according to the first exemplary embodiment.

FIG. 10 is a flow chart showing a third operation example during screen rotation of settlement terminal device 1. In FIG. 10, it is assumed that second information processing unit 3 includes an orientation detection unit (not shown). In FIG. 10, it is assumed that first information processing unit 2 is an insecure information processing unit.

When the orientation detection unit detects the orientation of settlement terminal device 1 with respect to gravity, second display unit 45 reflects a result of the detection performed by the orientation detection unit on the orientation of a second display content displayed on second touch panel 12. For example, second display unit 45 controls the direction of the second display content (for example, PIN input screen 101 and signature input screen 102) so that the direction of gravity matches the lower side of the display content, that is, so that the lower side of the display content is set to be a gravity action side.

First information processing unit 2 acquires orientation information (orientation information of the second display content) of a secure screen (second touch panel 12) through second IF unit 41 and first IF unit 40 (step S401). In addition, first information processing unit 2 may acquire orientation information of settlement terminal device 1 from the orientation detection unit in second information processing unit 3.

Subsequently, first display unit 29 displays a screen on first touch panel 10 with the same orientation as the direction of the secure screen in accordance with the orientation information of the secure screen (step S402). Here, first display unit 29 performs a display so that the direction of gravity matches the downward orientation of a first display content.

Subsequently, first CPU 21 determines whether or not a user's input through first touch panel 10 has been terminated (step S403). When the user's input has been terminated, the process of FIG. 10 is terminated. When the user's input has not been terminated, first CPU 21 acquires orientation information of the secure screen again and determines whether or not settlement terminal device 1 is rotated (step S404). In other words, it is determined whether or not settlement terminal device 1 is rotated in the middle of the input. When the settlement terminal device is not rotated, the process returns to step S403, and the input is continued.

When settlement terminal device 1 is rotated, first display unit 29 rotates and displays a screen in accordance with the rotation orientation of settlement terminal device 1 (step S405). In this case, when settlement terminal device 1 is rotated counterclockwise by 90 degrees, that is, when a second display content is rotated clockwise by 90 degrees, the first display content is rotated clockwise by 90 degrees. In other words, for example, the first display content is rotated by the same angle and with the same orientation as the second display content and is rotated in the opposite direction to the rotation orientation of settlement terminal device 1.

According to the operation example of FIG. 10, a screen is displayed depending on a result of the orientation detection performed by orientation detection unit 61, it is possible to fix the orientation of the screen with respect to a user, irrespective of the orientation in which the user holds settlement terminal device 1. In addition, it is possible to adjust the direction of first touch panel 10 to the direction of second touch panel 12. Therefore, it is possible to easily perform an input operation and display confirmation in a settlement process and to improve user convenience. In addition, even when the orientation detection unit is provided in first information processing unit 2 or second information processing unit 3, it is possible to similarly improve user convenience.

Figure 11:
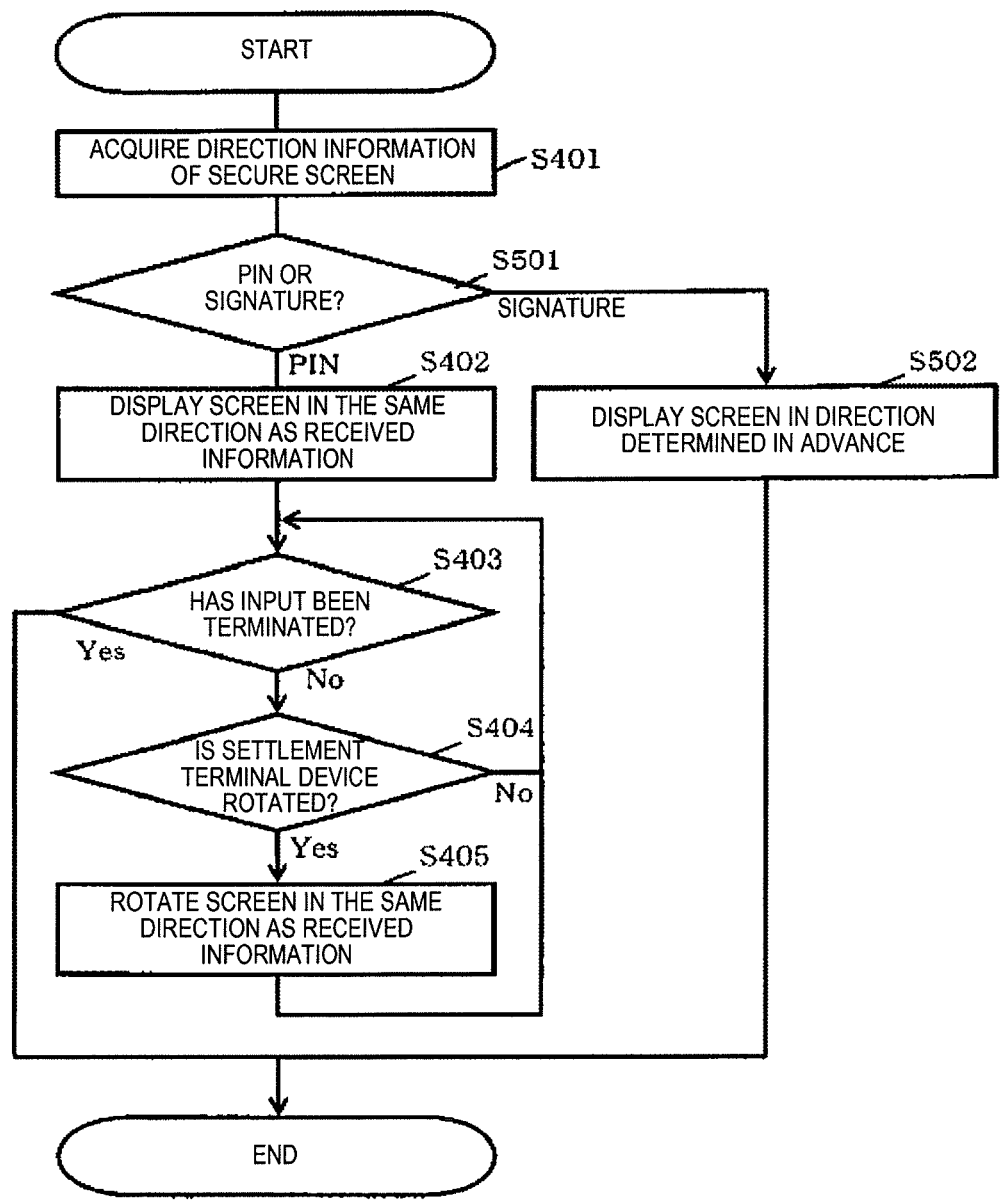
FIG. 11 is a flow chart showing a fourth operation example during screen rotation of the settlement terminal device according to the first exemplary embodiment.

FIG. 11 is a flow chart showing a fourth operation example during screen rotation of settlement terminal device 1. In FIG. 11, it is assumed that second information processing unit 3 includes an orientation detection unit (not shown). In FIG. 11, steps of performing the same processes as the steps of FIG. 10 will be denoted by the same reference numerals and signs, and a description thereof will be omitted or simplified.

First, first information processing unit 2 performs the process of step S401.

Subsequently, first CPU 21 determines whether or not a second display content displayed on second touch panel 12 includes PIN input screen 101 or signature input screen 102 (step S501). First information processing unit 2 acquires information regarding whether the second display content includes PIN input screen 101 or signature input screen 102 from second information processing unit 3, for example, through second IF unit 41 and first IF unit 40.

When the second display content includes PIN input screen 101, first information processing unit 2 performs the processes of step S402 to step S405. On the other hand, when the second display content includes signature input screen 102, first display unit 29 displays a screen in a orientation determined in advance as the first display content (step S502).

The orientation determined in advance means that the display direction in first touch panel 10 is determined so as to be necessarily the same direction with respect to settlement terminal device 1. This direction does not depend on the orientation of settlement terminal device 1 with respect to gravity. When second information processing unit 3 does not rotate signature input screen 102, both the display direction on first touch panel 10 and the direction of signature input screen 102 during a signature input do not depend on the orientation of settlement terminal device 1.

Whether settlement terminal device 1 performs the third operation example shown in FIG. 10 or performs the fourth operation example shown in FIG. 11 is determined, for example, during the manufacture or shipment of settlement terminal device 1 or is determined by user setting.

According to the operation example of FIG. 11, a screen is displayed in a fixed orientation with respect to settlement terminal device 1 without depending on a result of the orientation detection performed by orientation detection unit 61. Accordingly, for example, even when the orientation in which a user holds settlement terminal device 1 is changed, it is possible to suppress a frequent change in the orientation of the screen with respect to settlement terminal device 1 and to improve user convenience.

According to such a settlement terminal device 1, it is possible to improve input and display directions in accordance with the orientation of settlement terminal device 1 with respect to gravity while considering the aspect ratio of second touch panel 12 included in secure second information processing unit 3, and thus user convenience is secured.

Second Exemplary Embodiment

In the first exemplary embodiment, a case where the display content of second touch panel 12 includes PIN input screen 101 or signature input screen 102 has been described. In a second exemplary embodiment, a case where a display content of second touch panel 12 includes a handwritten PIN input screen will be described.

Settlement terminal device 1 in the second exemplary embodiment has the same configuration and function as the configuration and function of settlement terminal device 1 in the first exemplary embodiment. Settlement terminal device 1 in the second exemplary embodiment performs the same operation as the operation of settlement terminal device 1 in the first exemplary embodiment. A description of the same portions as those in the first exemplary embodiment will be omitted.

Figure 12A:
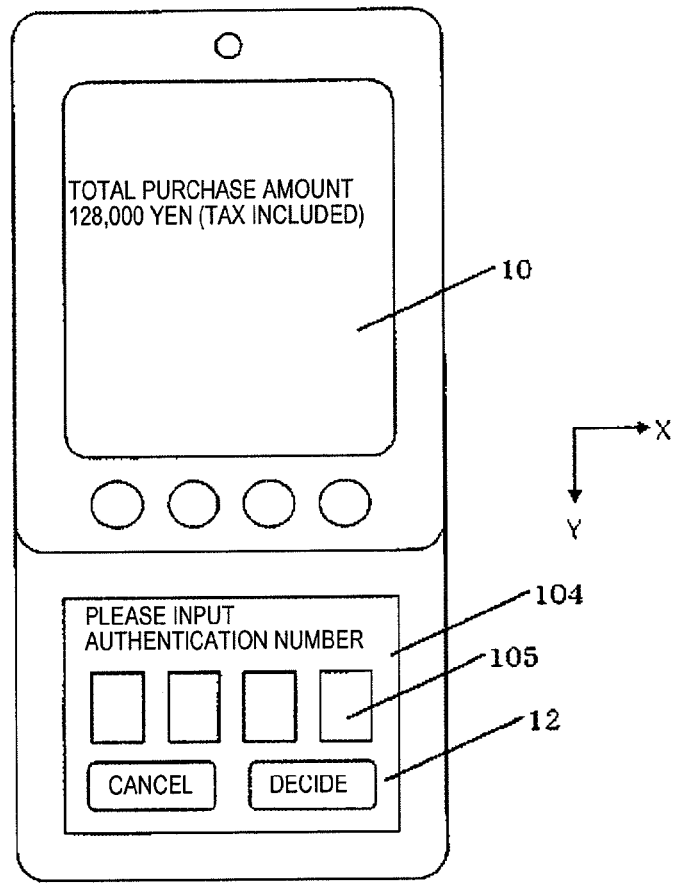
FIGS. 12A and 12B are schematic diagrams showing a first display example of money amount information and a first display example of a handwritten PIN input screen in a settlement terminal device according to a second exemplary embodiment.
Figure 12B:
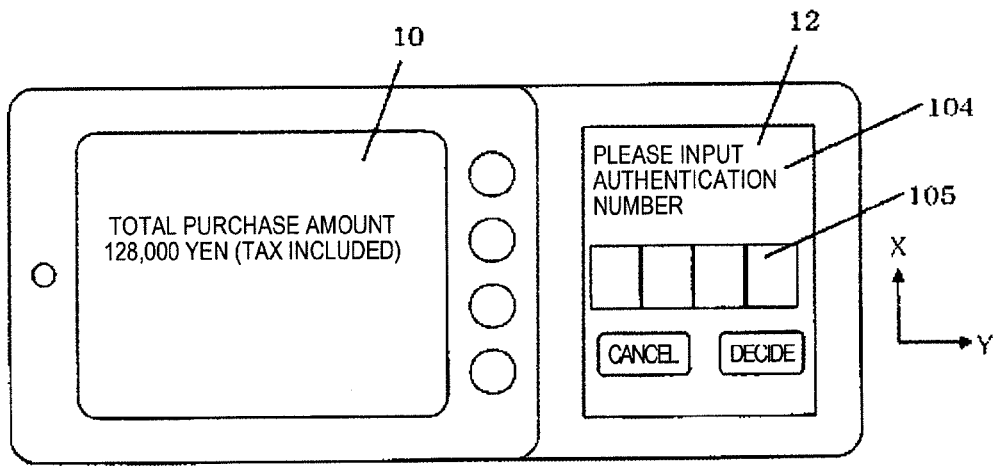

FIGS. 12A and 12B are schematic diagrams showing a display example of money amount information and a display example of handwritten PIN input screen 104 in settlement terminal device 1. In FIGS. 12A and 12B, first touch panel 10 displays, for example, money amount information, and second touch panel 12 displays, for example, handwritten PIN input screen 104. In handwritten PIN input screen 104, the number of a PIN is input using a finger or a stylus pen, for example, instead of using keys corresponding to the number of the PIN.

In FIGS. 12A and 12B, display directions and input directions (for example, the direction of an input to PIN handwriting input box 105) with respect to settlement terminal device 1 are different from each other. The differences in the display and input directions depend on the orientation of settlement terminal device 1 with respect to gravity. Here, differences from FIGS. 5A and 5B or FIGS. 6A and 6B will be mainly described.

In FIG. 12A, the gravity is downward (positive Y-axis direction). In FIG. 12A, second display unit 45 controls the position and orientation of PIN handwriting input box 105 to be displayed in second touch panel 12, and second touch input detection unit 46 controls an input detection direction (for example, a reading direction of an input PIN), as compared with FIGS. 5A and 6A. In FIG. 12A, input characters in PIN handwriting input box 105 are read toward the positive X-axis side from the negative X-axis side.

Thereby, for example, as in FIG. 12A, even when the orientation of settlement terminal device 1 is set to a portrait orientation, a user can easily view money amount information and handwritten PIN input screen 104 and to input a PIN by writing by hand.

In FIG. 12B, the gravity is downward (negative X-axis direction). In FIG. 12B, second display unit 45 controls the position and orientation of PIN handwriting input box 105 to be displayed in second touch panel 12, and second touch input detection unit 46 controls an input detection direction (for example, a reading direction of an input PIN), as compared with FIGS. 5B and 6B. In FIG. 12B, input characters in PIN handwriting input box 105 are read toward the positive Y-axis side from the negative Y-axis side.

Thereby, for example, as in FIG. 12B, even when the orientation of settlement terminal device 1 is set to a landscape orientation, a user can easily view money amount information and handwritten PIN input screen 104 and to input a PIN by writing by hand.

Figure 13A:
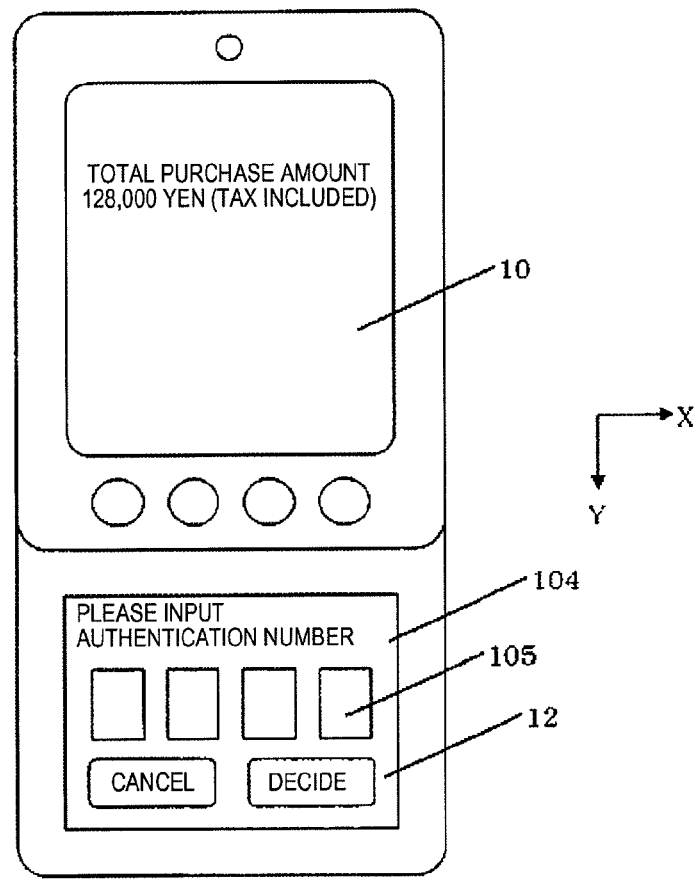
FIGS. 13A and 13B are schematic diagrams showing a second display example of money amount information and a second display example of a handwritten PIN input screen in the settlement terminal device according to the second exemplary embodiment.
Figure 13B:
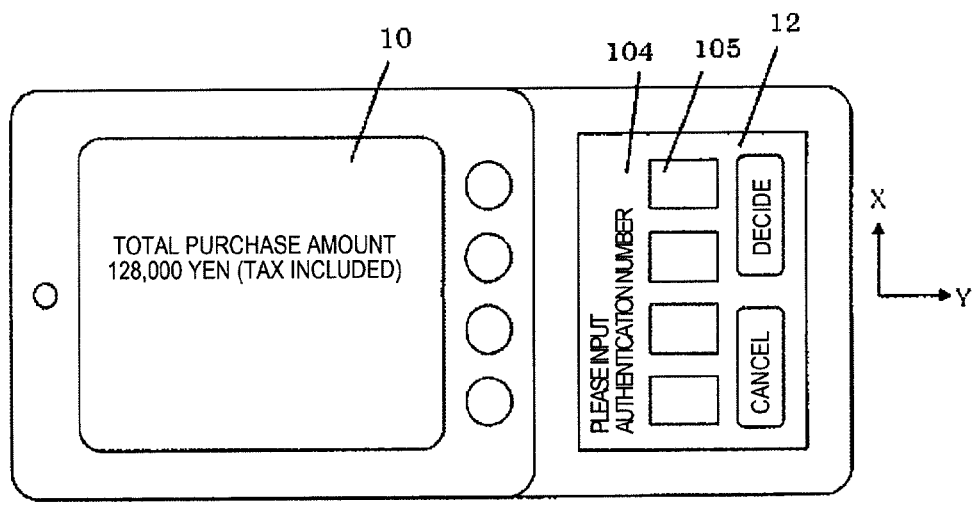
Figure 14:
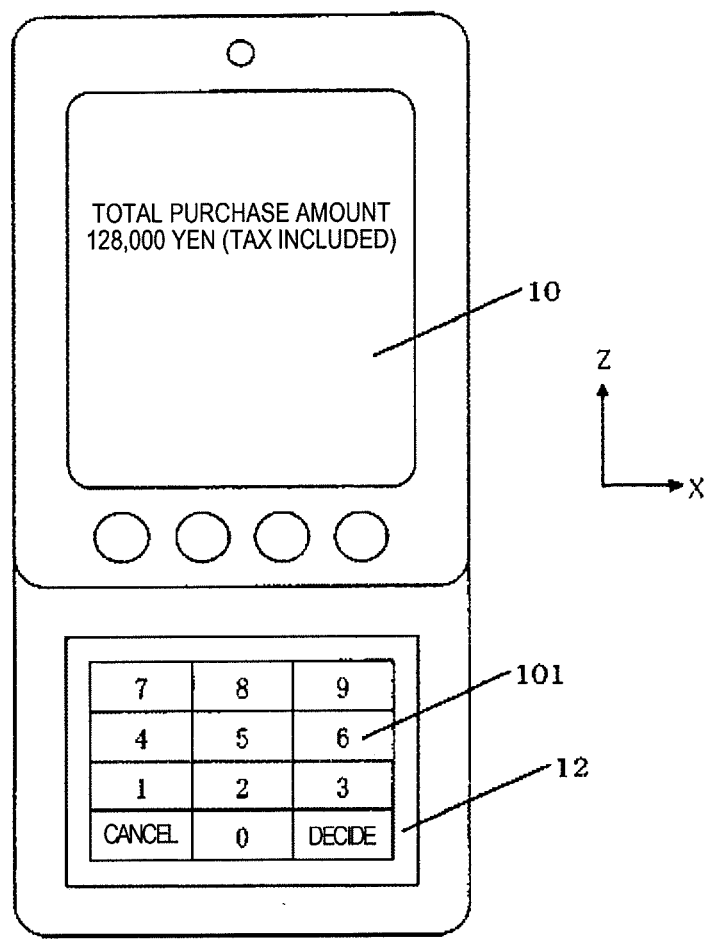
FIG. 14 is a schematic diagram showing a display example of money amount information and a display example of a PIN input screen in a settlement terminal device which is set to be in a substantially horizontal state according to an exemplary embodiment.

FIGS. 13A and 13B are schematic diagrams showing a display example of money amount information and a display example of a handwritten PIN input screen in settlement terminal device 1 and are modified examples of FIGS. 12A and 12B.

In FIG. 13A, the gravity is downward (positive Y-axis direction). FIG. 13A is the same as FIG. 12A.

In FIG. 13B, the gravity is downward (negative X-axis direction). In FIG. 13B, a display direction and an input direction in handwritten PIN input screen 104 do not depend on the direction of gravity, as compared with FIG. 12B. In this case, even when settlement terminal device 1 is rotated counterclockwise by 90 degrees from the state of FIG. 13A, the display direction and the input direction in handwritten PIN input screen 104 are not changed.

Accordingly, in FIG. 13A, the lower side (negative X-axis direction side) of a display content matches the direction (negative X-axis direction) of gravity. However, in FIG. 13B, the lower side (positive Y-axis direction side) of a display content does not match the direction (negative X-axis direction) of gravity. For example, when a length sufficient to allow easy signature formation can be secured as the length of PIN handwriting input box 105 in the longitudinal direction, the display direction and the input direction in handwritten PIN input screen 104 are more preferably controlled to have the directions shown in FIGS. 13A and 13B than to have the directions shown in FIGS. 12A and 12B.

The display direction and the input direction in handwritten PIN input screen 104 may be determined to be those of either FIGS. 12A and 12B or FIGS. 13A and 13B in accordance with a screen size or an aspect ratio of second touch panel 12.

For example, when the aspect ratio of second touch panel 12 is greater than a predetermined value, handwritten PIN input screen 104 may not be rotated in association with the display direction in first touch panel 10, as shown in FIG. 13B. In this case, PIN handwriting input box 105 of handwritten PIN input screen 104 is set to be in a horizontally long state in the state shown in FIG. 13A, and thus the handwriting input of a PIN is facilitated.

On the other hand, as shown in FIG. 12B, when handwritten PIN input screen 104 is rotated in association with the display direction in first touch panel 10, there is the possibility of the length of PIN handwriting input box 105 of handwritten PIN input screen 104 not being able to be sufficiently secured with respect to the input direction (Y-axis direction) in the state shown in FIG. 12B. Accordingly, as shown in FIG. 13B, it is preferable that handwritten PIN input screen 104 is not rotated in association with the display direction in first touch panel 10 in order to secure a sufficient length of PIN handwriting input box 105 in the input direction. In this case, similarly to FIG. 13A, the handwriting input of a PIN is performed in the X-direction.

In addition, for example, when the aspect ratio of second touch panel 12 is less than the predetermined value, the length of handwritten PIN input screen 104 in the input direction does not show too great a difference between the state shown in FIG. 12A and the state shown in FIG. 12B. That is, too great a difference is not shown between the input direction (X-axis direction) of handwritten PIN input screen 104 in the state shown in FIG. 12A and the input direction (Y-axis direction) of handwritten PIN input screen 104 in the state shown in FIG. 12B.

Therefore, handwritten PIN input screen 104 may be rotated in association with the display direction in the first touch panel as shown in FIG. 12B, and may not be rotated in association with the display direction in first touch panel 10 as shown in FIG. 13B.

When the orientation of the display content displayed on second touch panel 12 is changed in accordance with the orientation of settlement terminal device 1 with respect to gravity, it is possible to fix the orientation of handwritten PIN input screen 104 with respect to a user, irrespective of the orientation in which the user holds settlement terminal device 1. Therefore, it is possible to easily perform a PIN handwriting input operation and display confirmation in a settlement process and to improve user convenience.

An operation example during screen rotation of settlement terminal device 1 is the same as the operation examples of FIGS. 8 to 11.

According to settlement terminal device 1 in this exemplary embodiment, the same effects as those of settlement terminal device 1 in the first exemplary embodiment are obtained.

The present invention is not limited to the configuration of the above-mentioned exemplary embodiment, and can be applied to any configuration as long as the configuration is capable of realizing functions shown in claims or functions of the components of this exemplary embodiment.

For example, in both the first exemplary embodiment and the second exemplary embodiment, when a terminal is held so that first touch panel 10 is set to be in a substantially horizontal state, first display unit 29 and second display unit 45 may be configured to maintain (lock) the orientation (the orientation of a display content) of a screen which is no longer in the substantially horizontal state. A case where the substantially horizontal state is set refers to a case where the terminal is along a substantially XY plane, for example, when the positive Y-axis direction is a direction of gravity. For example, when rotation from the orientation of settlement terminal device 1 along the XY plane in FIG. 5A to the orientation of settlement terminal device 1 along the XZ plane is performed (for example, see FIG. 9), the orientation of a display content shown in FIG. 5A is maintained.

When the direction of a previous screen in a substantially horizontal state is not maintained, there is the possibility of the orientation of a display content being frequently changed in accordance with a result of detection performed by an orientation detection unit when settlement terminal device 1 is set to be in a substantially horizontal state. On the other hand, when the direction of a previous screen in a substantially horizontal state is maintained, the direction of a screen is not changed during a PIN input or a signature input in a state where settlement terminal device 1 is maintained substantially horizontal, and thus a user easily performs a settlement operation and settlement confirmation without being bewildered during the PIN input or the signature input.

In this exemplary embodiment, it is possible to improve an input and display of the settlement terminal device by adding the orientation of the settlement terminal device with respect to gravity and various display contents. Accordingly, it is possible to easily perform an input operation and display confirmation in a settlement process and to improve user convenience. The input and display of the settlement process may be improved while considering an aspect ratio of a second display unit included in a secure second information processing unit.

Even when an orientation detection unit detects the rotation of the settlement terminal device before a PIN input is completed after the input is started, the settlement terminal device may perform control so as not to change a display orientation of a first display content or a second display content. Thereby, the direction of the PIN input is also not changed until the input is completed, and thus a user easily performs a settlement operation and settlement confirmation without being bewildered during the PIN input.

In this exemplary embodiment, the first display content and the second display content are set to have the same orientation, and thus a user can easily view the first display content and the second display content.

In this exemplary embodiment, a screen is displayed in a fixed orientation with respect to the settlement terminal device without depending on the orientation of the settlement terminal device. Accordingly, for example, even when the orientation in which a user holds the settlement terminal device is changed, it is possible to suppress a frequent change in the direction of the screen with respect to the settlement terminal device and to improve user convenience.

In addition, when an aspect ratio of a second display unit including an input unit is greater than a predetermined value, the direction of a signature input screen or a handwritten PIN input screen is maintained at a direction in which the handwriting input of a signature or a PIN is likely to be performed, and thus it is possible to improve user convenience.

What is claimed is:

1. A settlement terminal device comprising:
    a first processor and a first display;
    a secure second processor and a second display; and
    a sensor which detects an orientation of the settlement terminal device with respect to gravity,
    wherein the first processor reflects a detection result of the sensor on an orientation of a first display content displayed on the first display, and
    wherein the secure second processor determines whether or not to reflect the detection result of the sensor on an orientation of a second display content, in accordance with the second display content displayed on the second display.

2. The settlement terminal device of claim 1, wherein when the second display content includes a personal identification number (PIN) input screen for inputting a PIN, the secure second processor controls a direction of the second display content in accordance with the detection result of the sensor.

3. The settlement terminal device of claim 2, wherein the secure second processor rotates the second display content by a same angle and with a same orientation as the first display content.

4. The settlement terminal device of claim 3, wherein the secure second processor aligns a plurality of PIN input keys included in the PIN input screen in accordance with the detection result of the sensor.

5. The settlement terminal device of claim 1, wherein when the second display content includes a signature input screen for inputting a signature or a handwritten PIN input screen for inputting a PIN by writing by hand, the secure second processor fixes a direction of the second display content, independently from the detection result of the sensor.

6. The settlement terminal device of claim 1, wherein when the second display content includes a signature input screen for inputting a signature or a handwritten PIN input screen for inputting a PIN by writing by hand and an aspect ratio in the second display is equal to or higher than a predetermined ratio, the secure second processor fixes a direction of the second display content, independently from the detection result of the sensor.

7. The settlement terminal device of claim 1, wherein when the second display content includes a signature input screen for inputting a signature or a handwritten PIN input screen for inputting a PIN by writing by hand, the secure second processor controls a direction of the second display content in accordance with the detection result of the sensor.

8. The settlement terminal device of claim 1, wherein when the second display content includes a signature input screen for inputting a signature or a handwritten PIN input screen for inputting a PIN by writing by hand and an aspect ratio in the second display is less than a predetermined ratio, the secure second processor controls a direction of the second display content in accordance with the detection result of the sensor.

9. The settlement terminal device of claim 8, wherein the secure second processor rotates the second display content by a same angle and with a same orientation as the first display content.

10. The settlement terminal device of claim 1, wherein the secure second processor further determines whether or not to reflect the detection result of the sensor on the orientation of the second display content in accordance with an input received by the second display.

11. The settlement terminal device of claim 10, wherein the secure second processor does not reflect the detection result of the sensor on the orientation of the second display content when the input is started and not completed.

12. The settlement terminal device of claim 1, wherein the secure second processor further determines whether or not to reflect the detection result of the sensor on the orientation of the second display content in accordance with an orientation of a previous screen.

13. The settlement terminal device of claim 1, wherein the secure second processor determines whether or not to reflect the detection result of the sensor on the orientation of the second display content based on whether the second display content comprises alphabetic content or numeric content.

14. The settlement terminal device of claim 13, wherein the secure second processor reflects the detection result of the sensor on the orientation of the second display content when the second display content requires the alphabetic content.

15. The settlement terminal device of claim 13, wherein the secure second processor reflects the detection result of the sensor on the orientation of the second display content when the second display content requires the numeric content.

16. A settlement process method using a settlement terminal device including a first processor and a secure second processor, the settlement process method comprising:
    detecting an orientation of the settlement terminal device with respect to gravity;
    reflecting a detection result of the orientation on an orientation of a first display content displayed on a first display associated with the first processor; and
    determining whether or not to reflect the detection result of the orientation on an orientation of a second display content, in accordance with the second display content displayed on a second display associated with the secure second processor.

17. The settlement terminal device of claim 1, wherein
    the first processor rotates the first display content in accordance with the orientation of the settlement terminal device detected by the sensor, and
    the secure second processor rotates the second display content in accordance with the orientation of the settlement terminal device detected by the sensor when the second display content displayed on the second display requires a user to input first information.

18. The settlement terminal device of claim 17, wherein
    the secure processor does not rotate the second display content in accordance with the orientation of the settlement terminal device detected by the sensor when the second display content displayed on the second display requires a user to input second information.

19. The settlement terminal device of claim 18, wherein at least one of the following is met: the first information includes a personal identification number (PIN); and the second information includes a signature of a user.

20. The settlement terminal device of claim 18, further comprising:
a card reader which reads a card and obtains card information of the card, wherein
the secure second processor determines whether the second display content requires the first information or the second information in accordance with the card information obtained by the card reader.

* * * * *